United States Patent [19]
Telfer

[11] Patent Number: 4,458,780
[45] Date of Patent: Jul. 10, 1984

[54] MOBILE CRANES OR AERIAL LIFT PLATFORMS

[75] Inventor: James D. Telfer, Sunderland, England

[73] Assignee: Coles Cranes Limited, England

[21] Appl. No.: 297,282

[22] Filed: Aug. 27, 1981

[30] Foreign Application Priority Data

Sep. 3, 1980 [GB] United Kingdom ............... 8028469

[51] Int. Cl.³ ..................... E04G 1/00; B66C 23/04
[52] U.S. Cl. .................................. 182/2; 212/189; 212/231
[58] Field of Search ............ 212/195, 189, 223, 232, 212/230, 231, 237–238, 247, 255, 264; 280/781, 797, 638; 182/2, 63, 141; 180/DIG. 905, DIG. 906

[56] References Cited

U.S. PATENT DOCUMENTS

| | | | |
|---|---|---|---|
| 645,982 | 3/1900 | Sperling | 182/63 |
| 1,927,598 | 9/1933 | Schlichler | 182/141 |
| 1,981,680 | 11/1934 | Tindale | 182/141 |
| 2,392,004 | 1/1946 | Sherman | 212/238 |
| 2,627,560 | 2/1953 | Eitel | 182/2 |
| 2,852,149 | 9/1958 | Bruneri et al. | 212/247 |
| 2,861,730 | 11/1958 | Deahl | 182/63 |
| 4,039,094 | 8/1977 | Grove | 212/189 |
| 4,130,178 | 12/1978 | Smith, Jr. | 182/63 |

FOREIGN PATENT DOCUMENTS 685614  9/1979  U.S.S.R. ................ 212/255

Primary Examiner—Trygve M. Blix
Assistant Examiner—R. B. Johnson
Attorney, Agent, or Firm—Townsend and Townsend

[57] ABSTRACT

A mobile crane or aerial lift platform vehicle wherein the chassis comprises a horizontally disposed solid metal slab carrying axle/outrigger mountings and on which the boom or jib turntable is mounted. This has the advantage both of providing stability because of the weight of the solid chassis and of cheaper fabrication and assembly.

2 Claims, 2 Drawing Figures

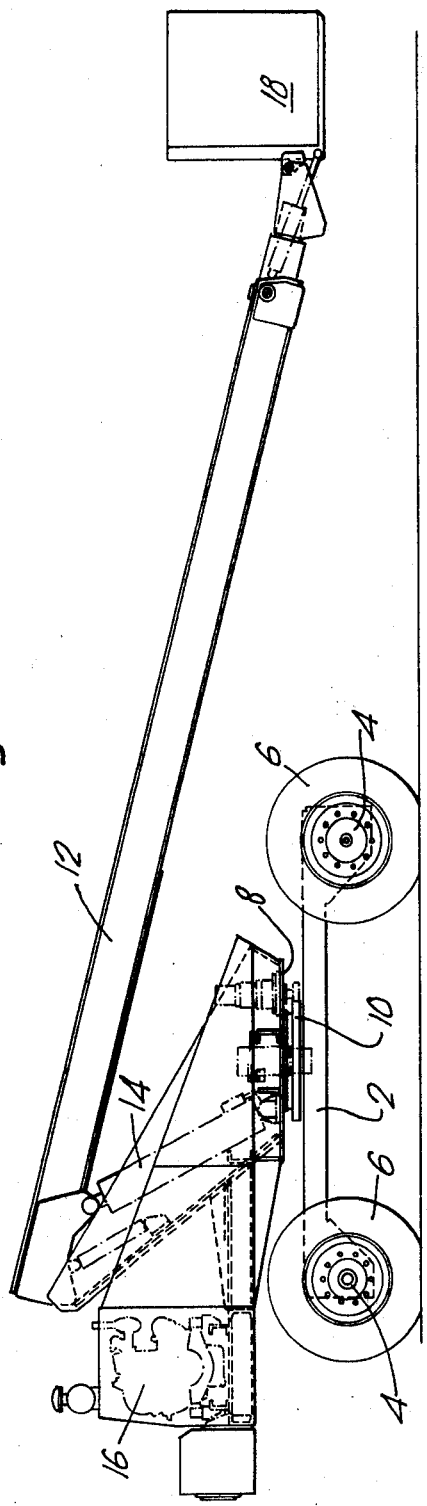

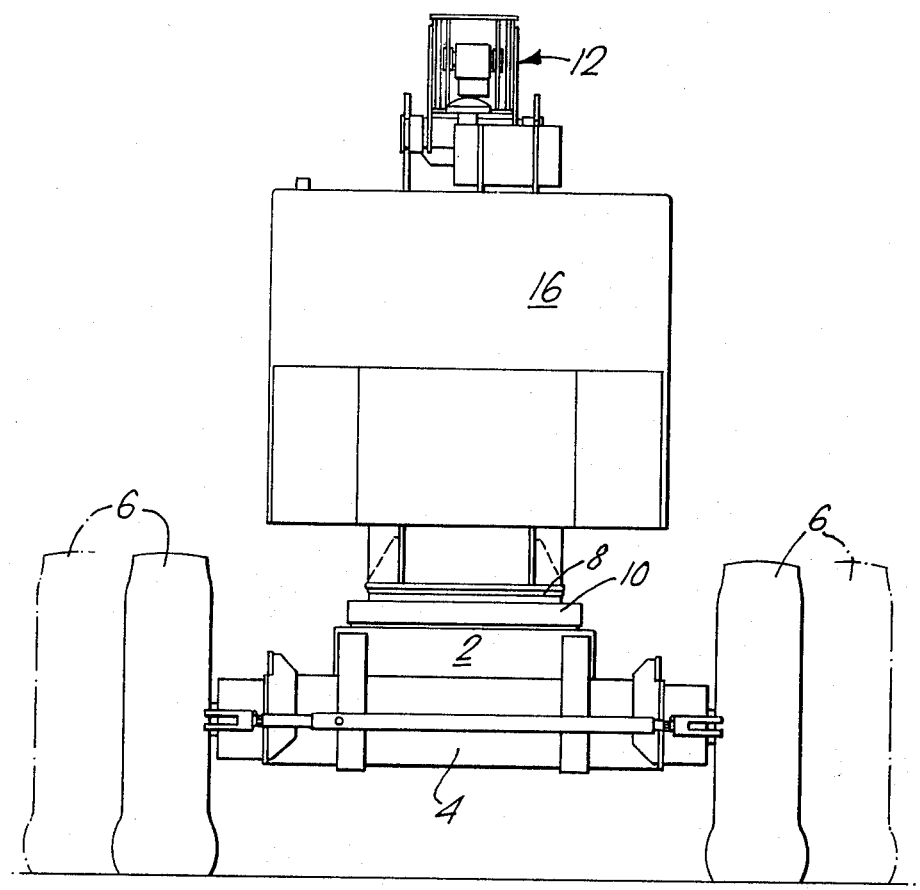

MOBILE CRANES OR AERIAL LIFT PLATFORMS

BACKGROUND OF THE INVENTION

This invention relates to mobile cranes or aerial lift platforms. In each case a turntable or its equivalent is provided rotatably mounted on the chassis of the vehicle and carrying a boom or jib which may be telescopic and which carries the hoist load suspension cables or the man carrying platform or basket.

Since a forward overturning moment is created by the weight of the boom together with the load lifted in the case of a crane or with the basket and operator of the lifting platform, it is necessary to introduce a counter-balancing or stability moment by fitting some form of ballast weight at the most advantageous part of the rotating structure.

On many machines unless they are fitted with suitable outriggers or extending axles, the overturning condition is most unfavourable when the rotating structure is at 90° to the longitudinal axis of the chassis. In this position it is also essential to ensure that the rearward stability condition of the machine, i.e. with the boom head point at its minimum radius, is satisfactory.

To meet these stability requirements and to achieve the most efficient and economical use of material it has hitherto been necessary to fit an additional counterweight to the chassis normally in the form of separate cast iron or steel weights bolted to the chassis frame structure, the frame being constructed from rolled steel sections, i.e. joist, channel or plate fabrication.

This results in a chassis unit which is expensive to fabricate and assemble. It is further complicated by the need to provide a stiff base on the chassis frame to support the rotating upper machine structure.

SUMMARY OF THE INVENTION

A vehicle in accordance with this invention for carrying a boom or jib of a mobile crane or aerial lift platform has a chassis comprising a horizontally disposed solid slab of metal preferably of rectangular cross section, and which carries the axle/outrigger mountings and on which the boom or jib turntable may be mounted.

The solid rectangular slab replaces the conventional chassis frame structure and at the same time serves as a counterweight to counteract the overturning moments of the machine.

A chassis of a vehicle in accordance with this invention provides an economical and efficient means of supporting the rotating parts and provides a structure having greater strength than is usually necessary because of its dual purpose and obviates the need in many instances of providing an additional cylindrical plinth for supporting the rotating bearing.

The chassis slab may for example be of steel up to 10—12" thick and of high tensile quality yield strength.

BRIEF DESCRIPTION OF THE DRAWINGS

The invention will now be further described by way of example with reference to the accompanying drawings in which:

FIG. 1 is a side elevation of a mobile aerial lift platform vehicle and

FIG. 2 is a corresponding end elevation.

DETAILED DESCRIPTION OF THE PREFERRED EMBODIMENT

Referring to the drawings the vehicle comprises a chassis in the form of a solid steel metal slab 2 10–12" thick and carrying two axles 4, for the wheels 6 which may be extended out from the sides of the chassis on outriggers as shown in dot and dash lines in FIG. 2 to aid stability.

A turntable 8 is rotatably mounted about a vertical axis on the chassis through a slew ring 10. The turntable carries an extendible boom 12 which in use is lifted about a horizontal axis by a jack 14, and a motor compartment 16. The operator is carried on a basket 18 rotatably mounted at the outer end of the boom 12.

The solid metal chassis 2 not only provides a strong rigid mounting for the various parts carried thereby but also its weight helps to counterbalance the boom and basket when the boom is extended for use.

I claim:
1. A mobile extendible boom vehicle comprising:
   a chassis comprising a horizontally disposed solid metal slab of steel about 10–12 inches thick;
   two axles carried by said chassis, one axle at each end thereof;
   four laterally movable outrigger wheels supported by said two axles and so arranged that each wheel is positioned adjacent a corner of said slab means for moving said outrigger wheels;
   a turntable pivotally mounted on said chassis for movement about a vertical axis;
   an extendible boom movable about a horizontal axis, a motor compartment, and a boom lift jack operably coupled to the boom, mounted on said turntable; and
   load supporting means supported by and at the outer end of said extendible boom;
   wherein said solid slab and four outrigger wheels are so dimensioned and arranged as to counteract the overturning moments of the vehicle when in use.
2. The vehicle of claim 1 wherein said load supporting means includes a basket.
   * * * * *